(12) United States Patent
Franklin, Jr.

(10) Patent No.: US 8,074,898 B2
(45) Date of Patent: Dec. 13, 2011

(54) WINDSHIELD WIPER RESERVOIR SYSTEM

(76) Inventor: Cleve Franklin, Jr., Glencoe, AL (US)

( * ) Notice: Subject to any disclaimer, the term of this patent is extended or adjusted under 35 U.S.C. 154(b) by 150 days.

(21) Appl. No.: 12/389,467

(22) Filed: Feb. 20, 2009

(65) Prior Publication Data

US 2009/0212130 A1 Aug. 27, 2009

Related U.S. Application Data

(60) Provisional application No. 61/030,381, filed on Feb. 21, 2008.

(51) Int. Cl.
*B05B 1/10* (2006.01)
*B60S 1/46* (2006.01)

(52) U.S. Cl. ............... 239/284.2; 239/284.1; 239/398; 15/250.01; 15/250.02

(58) Field of Classification Search .............. 239/284.1, 239/284.2, 398; 15/250.01, 250.02
See application file for complete search history.

(56) References Cited

U.S. PATENT DOCUMENTS

| | | | |
|---|---|---|---|
| 3,760,451 A | 9/1973 | Steed | |
| 5,152,461 A * | 10/1992 | Proctor | 239/304 |
| 5,327,613 A | 7/1994 | Ohtsu | |
| 5,753,047 A | 5/1998 | Rach et al. | |
| 5,853,025 A * | 12/1998 | Daneshvar | 137/565.34 |
| 6,237,627 B1 * | 5/2001 | Boule | 137/571 |
| 6,561,209 B2 * | 5/2003 | Wojan et al. | 137/79 |
| 6,732,953 B2 * | 5/2004 | Krause et al. | 239/284.1 |
| 7,171,716 B2 * | 2/2007 | Franco et al. | 15/250.05 |

* cited by examiner

*Primary Examiner* — Dinh Nguyen
(74) *Attorney, Agent, or Firm* — Jerry D. Haynes; The Law Office of Jerry D. Haynes

(57) ABSTRACT

Disclosed is a windshield wiper reservoir system for cleaning a windshield of a vehicle. The reservoir system includes a first reservoir, a second reservoir, a motor system, and a plurality of wiper tubes coupled to the motor system. The first reservoir is configured to store a wiper fluid and the second reservoir is configured to store a de-icing fluid. The motor system is configured to drive at least one of the wiper fluid from the first reservoir and the de-icing fluid from the second reservoir. Each of the plurality of wiper tubes includes a spray head. Further, the each of the plurality of wiper tubes is configured to receive the at least one of the wiper fluid and the de-icing fluid. Furthermore, the spray head is configured to spray the at least one of the wiper fluid and the de-icing fluid onto the windshield of the vehicle.

13 Claims, 2 Drawing Sheets

WINDSHIELD WIPER RESERVOIR SYSTEM

CROSS-REFERENCE TO RELATED APPLICATIONS

The present invention claims priority under 35 United States Code, Section 119 on the U.S. Provisional Patent Application No. 61/030,381 filed on Feb. 21, 2008, the disclosure of which is incorporated by reference.

FIELD OF THE INVENTION

The present invention relates generally to windshield cleaning apparatuses used in vehicles, and more particularly, to a windshield wiper reservoir system for cleaning a windshield in a vehicle.

BACKGROUND OF THE INVENTION

A windshield of a vehicle mainly protects the vehicle's occupants from wind, temperature extremes, flying debris such as dust, insects, and rocks, and the like. Environmental elements, such as dust and dirt, may settle on the windshield, forming a layer that adversely affects the visibility of a driver of the vehicle. The windshield requires regular cleaning to maintain the driver's visibility. Windshield wipers (also referred to as windscreen wipers) are typically used in vehicles for cleaning and wiping windshields of vehicles. The windshield wipers clean (i.e., wipe) the windshield to prevent build-up of the layer that adversely affects the visibility of the driver. Generally, a windshield wiper is designed to include an arm pivoted at one end, and with the other end of the arm having a rubber blade attached thereto. The arm is configured to have the rubber blade that makes sweeping motions on the windshield for wiping of the windshield of the vehicle. The vehicle usually also features controls to provide the driver of the vehicle with a capability of controlling motion of the arm of the windshield wiper.

In addition to the windshield wiper and arm-motion control switches, a vehicle usually includes a reservoir for storing a fluid medium such as water or a liquid soap. Further, a motorized connection is provided for driving the fluid medium from the reservoir towards vents mounted either beneath the windshields or beneath the rubber blades. The vents are configured to facilitate spraying of the fluid medium on the windshield. The motorized connection is further designed to drive the fluid medium with substantial force, thereby spraying the fluid medium from the vents onto the windshield. The sweeping motion of the rubber blade of the windshield wiper sweeps the fluid medium across the windshield, thereby cleaning the environmental elements such as dirt and debris accumulated on the windshield.

During severe weather conditions, such as a snowfall, environmental elements such as ice or frost build up quickly on the windshield of the vehicle. Frost and ice build-up on the windshield of the vehicle reduces ability of the windshield wipers to clean the windshield. In such cases, a person traveling in the vehicle may have to manually scrape away the frost or ice build-up using a scraping tool, before proceeding to use the vehicle. Neglecting the build-up of the environmental elements on the windshield may reduce the visibility for driving the vehicle. Driving in reduced visibility may result in a serious safety hazard. Further, use of the scrapping tool for manually scraping the frost or the ice build-up may damage the windshield.

Typical solutions such as spraying a pre-heated fluid medium onto the windshield for removing accumulated frost or ice build-up consume a substantial amount of time before improving the visibility for driving the vehicle. Also, removing the accumulated frost or ice build-up using such typical solutions may leave an opaque layer on the windshield, further degrading visibility of the driver of the vehicle.

Based on the foregoing, there exists a need for cleaning a windshield of a vehicle, to prevent build-up of the environmental elements on the windshield, for improving visibility of a driver of the vehicle. There also exists a need for precluding manual scrapping for removing the build-up of the environmental elements on the windshield of the vehicle. Further, there exists a need for preventing build-up of environmental elements on the windshield of the vehicle in a time-efficient and low-cost manner.

SUMMARY OF THE INVENTION

In view of the foregoing disadvantages inherent in the prior art, the general purpose of the present invention is to provide a windshield wiper reservoir system for improving visibility of a driver of a vehicle by preventing build-up of environmental elements on a windshield of the vehicle, to include all advantages of the prior art, and to overcome the drawbacks inherent in the prior art An object of the present invention to preclude manual scrapping for removing the build-up of environmental elements on the windshield of the vehicle.

Another object of the present invention to prevent build-up of environmental elements on the windshield of the vehicle in a time-efficient and low-cost manner.

To achieve the above objects, the present invention provides a windshield wiper reservoir system for cleaning a windshield of a vehicle. The windshield wiper reservoir system includes a first reservoir including a first closeable opening. The first reservoir is configured to store a wiper fluid. Further, the windshield wiper reservoir system includes a second reservoir coupled to the first reservoir. The second reservoir includes a second closeable opening and is configured to store a de-icing fluid. Further, the windshield wiper reservoir system includes a motor system coupled to the first reservoir and the second reservoir. The motor system is configured to drive at least one of the wiper fluid from the first reservoir and the de-icing fluid from the second reservoir. Furthermore, the windshield wiper reservoir system includes a plurality of wiper tubes coupled to the motor system. Each of the plurality of wiper tubes includes a spray head and is configured to receive the at least one of the wiper fluid from the first reservoir and the de-icing fluid from the second reservoir. The spray head is configured to spray the at least one of the wiper fluid and the de-icing fluid onto the windshield of the vehicle.

This together with the other aspects of the present invention, along with the various features of novelty that characterized the present invention, is pointed out with particularity in the claims annexed hereto and forms a part of the present invention. For a better understanding of the present invention, its operating advantages, and the specified object attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION OF THE INVENTION

For a thorough understanding of the present invention, reference is to be made to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "coupled," and variations thereof herein are used broadly and encompass direct and indirect couplings.

The terms, "first," "second," "top," "bottom," and the like, herein do not denote any order, elevation or importance, but rather are used to distinguish placement of one element over another. Further, the terms, "a" and "an" herein do not denote a limitation of quantity, but rather denote the presence of at least one of the referenced item.

The present invention describes a windshield wiper reservoir system for cleaning a windshield of a vehicle. The windshield wiper reservoir system is configured to prevent build-up of environmental elements on the windshield of the vehicle. The windshield wiper reservoir system includes a first reservoir and a second reservoir for storing a wiper fluid and a de-icing fluid, respectively. A motor system is coupled to the first reservoir and the second reservoir for driving the wiper fluid and the de-icing fluid through wiper tubes onto the windshield of the vehicle for preventing build-up of the environmental elements on the windshield, thereby improving visibility of the driver of the vehicle.

Figure 1:
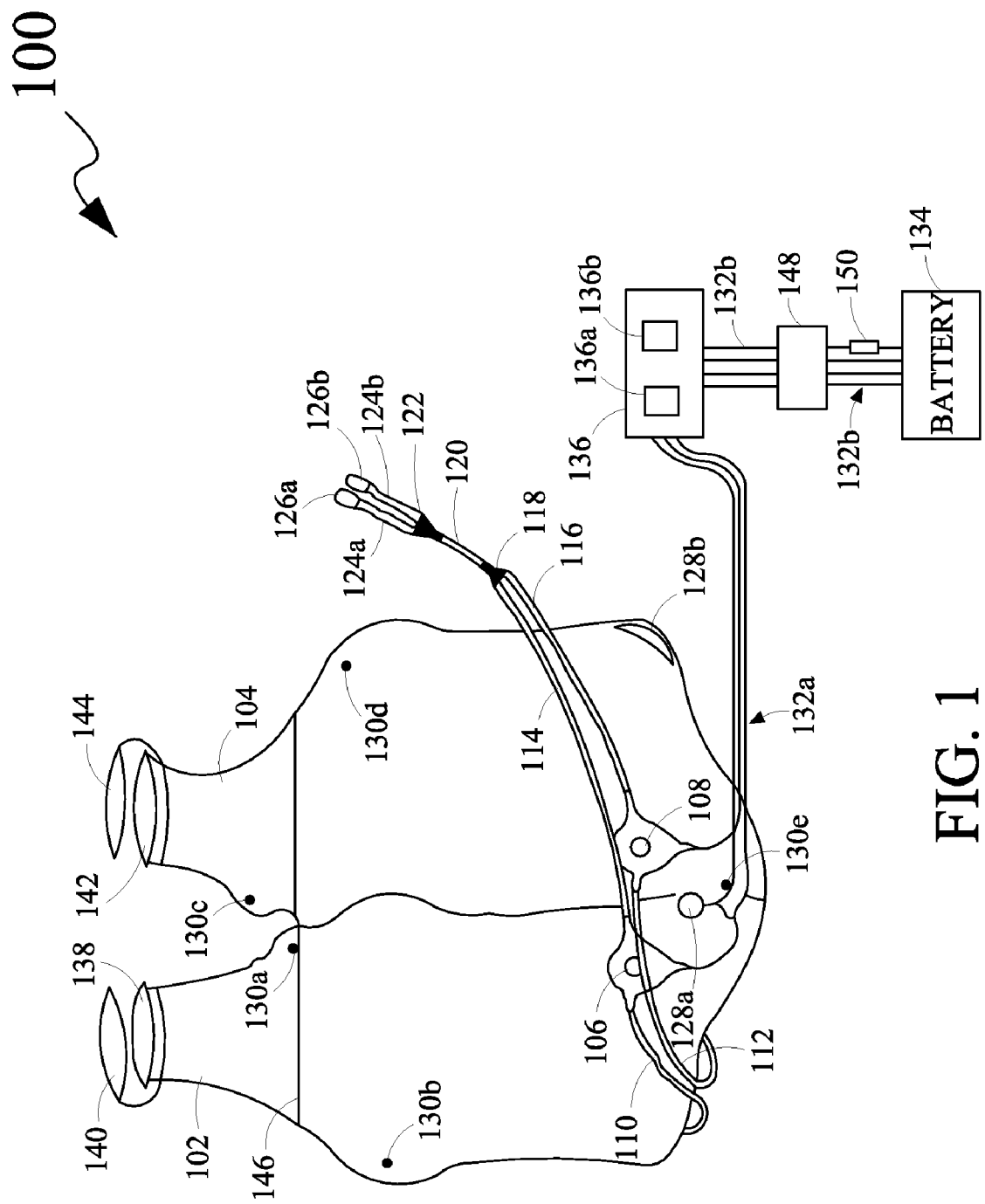
FIG. 1 illustrates a windshield wiper reservoir system, in accordance with an embodiment of the present invention.

Referring now to FIG. 1, an exemplary view of the windshield wiper reservoir system 100 is shown, according to one embodiment of the present invention. The windshield wiper reservoir system 100 includes two reservoirs, a first reservoir 102 and a second reservoir 104 (hereinafter collectively referred to as "the reservoirs"). Further, the windshield wiper reservoir system 100 (hereinafter referred to as 'reservoir system 100') includes a first motor 106, a second motor 108 and a wiper tubing system connected to the first motor 106 and the second motor 108. The first motor 106 and the second motor 108 may hereinafter be collectively referred to as a motor system of the reservoir system 100. The wiper tubing system includes a plurality of wiper tubes such as a first rear tube 110, a second rear tube 112, a first front tube 114 and a second front tube 116, and a first connector 118, a connecting tube 120, a second connector 122, a pair of wiper tubes such as a wiper tube 124a and a wiper tube 124b. The wiper tubes 124a and 124b will hereinafter be collectively referred to as wiper tubes 124. Each of the wiper tubes 124 includes a spray head, such as a spray head 126a on the wiper tube 124a and a spray head 126b on the wiper tube 124b. The spray heads 126a and 126b will hereinafter be collectively referred to as spray heads 126.

The reservoir system 100 also includes a plurality of sensors, such as a sensor 128a and a sensor 128b and a plurality of flanges such as a flange 130a, a flange 130b, a flange 130c, flange 130d and a flange 130e. The plurality of sensors, such as sensors 128a and 128b will hereinafter be collectively referred to as plurality of sensors 128. The plurality of flanges, such as flanges 130a, 130b, 130c, 130d and 130e will hereinafter be collectively referred to as plurality of flanges 130. The reservoir system 100 further includes a wire harness 132a and a wire harness 132b adapted to electrically couple the first motor 106 and the second motor 108 to a source of power supply, such as a car battery 134, installed in the vehicle. More specifically, the wire harness 132a electrically couples the first motor 106 and the second motor 108 to a control module 136 and the wire harness 132b electrically couples the control module 136 to the car battery 134. The control module 136 includes a plurality of light-emitting diodes (LED) such as an LED 136a and a plurality of control switches such as a control switch 136b for controlling various operations of the reservoir system 100. By this, the wire harness 132a and the wire harness 132b couple the first motor 106 and the second motor 108 to the car battery 134.

The first reservoir 102 is configured to store a fluid such as a wiper fluid. The first reservoir 102 may include a first closeable opening 138 that may serve as a medium for receiving the wiper fluid into a space configured by a lateral surface and a bottom surface of the first reservoir 102. Further, the first reservoir 102 includes a first cap 140 that may be removably coupled to the first closeable opening 138. The first cap 140 may be configured for covering the first closeable opening 138 of the first reservoir 102.

The second reservoir 104 may store a fluid that may be different from the wiper fluid, such as a de-icing fluid. The second reservoir 104 may include a second closeable opening 142 for receiving the de-icing fluid into a space configured by a lateral surface and a bottom surface of the second reservoir 104. Further, the second reservoir 104 includes a second cap 144 that may be removably coupled to the second closeable opening 142. The second cap 144 may be configured for covering the second closeable opening 142 of the second reservoir 104.

For the purposes of this description, the wiper fluid and the de-icing fluid of the first reservoir 102 and the second reservoir 104 respectively may collectively be referred to as "the fluid". The fluid may be maintained at a level above a pre-defined threshold level in the first reservoir 102 and the second reservoir 104. However, the wiper fluid and the de-icing fluid (of the first reservoir 102 and the second reservoir 104 respectively) may also have different pre-defined threshold levels.

The first cap 140 and the second cap 144 may be of different colors to distinguish between the first reservoir 102 and the second reservoir 104. Further, the different color of the first cap 140 and the second cap 144 may signify different fluids in the first reservoir 102 and the second reservoir 104, respectively.

The first motor 106 may be coupled to the first reservoir 102 through a first rear tube 110 of the first reservoir 102. The first motor 106 is capable of applying a suction force for drawing the wiper fluid from the first reservoir 102. The wiper fluid, drawn from the first reservoir 102 into the first rear tube 110, is relayed by the first motor 106 to the first front tube 114.

The first front tube 114 couples the first motor 106 to the connecting tube 120 via the first connector 118.

Similarly, the second motor 108 may be coupled to the second reservoir 104 through the second rear tube 112. The second motor 108 is capable of applying a suction force for drawing the de-icing fluid from the second reservoir 104. The de-icing fluid, drawn from the second reservoir 104 into the second rear tube 112, is relayed by the second motor 108 to the second front tube 116. The second front tube 116 couples the second motor 108 to the connecting tube 120 via the first connector 118.

The first connector 118 is typically designed with three arms (Y-shaped). The three arms of the first connector 118 are configured to connect with the first front tube 114, the second front tube 116 and the connecting tube 120, respectively. Each arm of the first connector 118 serves as a narrow passageway with an anterior end and a posterior end. An opening is provided at anterior ends of each arm of the first connector 118 for receiving fluid such as the wiper fluid and the de-icing fluid. In an embodiment, a user, such as a driver of a vehicle, may wish to draw either of the wiper fluid and the de-icing fluid. A posterior end of each of the arms is interconnected to posterior ends of the remaining two arms of the first connector 118. The first connector 118 receives the fluid such as the wiper fluid and/or the de-icing fluid relayed by the first front tube 114 and the second front tube 116 respectively, and directs the fluid to the connecting tube 120.

The connecting tube 120 is configured with a first end and a second end. The first end of the connecting tube 120 is configured to be connected with one of the three arms of the first connector 118 and thus establishing a connection with the first connector 118. The second end of the connecting tube 120 may be connected with the second connector 122. The second connector 122 may have a structural configuration similar to the first connector 118 and is configured to have three arms. The three arms of the second connector 122 may be connected to the connecting tube 120, the wiper tube 124a and the wiper tube 124b, respectively. The second connector 122 is configured to receive the fluid (the wiper tube and/or the de-icing fluid) from the connecting tube 120 and further, to pass the fluid to the wiper tubes 124 (the wiper tubes 124a and the wiper tube 124b).

The wiper tubes 124 receive the fluid relayed by the second connector 122. First ends of the wiper tubes 124 are connected to the second connector 122 and receive the fluid from the second connector 122 and second ends of the wiper tubes 124 are receivable in the spray heads 126. The spray heads 126 configured at ends of the wiper tubes 124 spray the fluid received by the wiper tubes 124 over a windshield (not shown) of a vehicle. It will be evident to those ordinary skilled in the art that the spray heads 126 may be located at a plurality of positions, such as on top of the windshield or at bottom of the windshield, to spray the fluid medium onto the windshield.

In an embodiment, the motor system (the first motor 106 and the second motor 108) of the reservoir system 100 may draw the fluid (the wiper fluid and/or the de-icing fluid) from the reservoirs (the first reservoir 102 and/or the second reservoir 104) based on the pre-defined threshold level of the fluid in the reservoirs. For example, the motor system may draw the fluid from the reservoir when the level of the fluid in the reservoirs is above the pre-defined threshold level of the fluid.

Each time when the fluid is sprayed over the windshield (not shown), of the vehicle, from the spray heads 126 (of the reservoir system 100) the level of the fluid drops in the reservoirs. For example, if the wiper fluid is sprayed from the first reservoir 102, the level of the wiper fluid in the first reservoir 102 drops accordingly.

The plurality of sensors 128 of the reservoir system 100 may be configured to sense the drop in level of the fluid in reservoirs. The plurality of sensors 128 may sense a drop in the level of the fluid below the pre-defined threshold level. The sensor 128a and the sensor 128b of the plurality of sensors 128 may be coupled to the first reservoir 102 and the second reservoir 104. The sensor 128a may be configured to sense a drop in the level of the wiper fluid in the first reservoir 102. In one embodiment, the sensor 128a may sense the drop in the level of the wiper fluid below the pre-defined threshold level of the wiper fluid in the first reservoir 102. Similarly, the sensor 128b may be configured to sense a drop in the level of the de-icing fluid in the second reservoir 104.

On sensing the drop in the level of the fluid (the wiper fluid and/or the de-icing fluid) in the reservoirs (the first reservoir and/or the second reservoir), the plurality of sensors 128 may provide an indication to a driver of the vehicle. The indication may be provided in form of a flashing of the plurality of LEDs, such as an LED 136a provided on the control module 136. The driver of the vehicle may thereafter, remove a cap, such as the first cap 140 and/or the second cap 144 of the reservoirs for refilling the fluid, such as the wiper fluid and/or the de-icing fluid, into the first reservoir 102 and/or the second reservoir 104, respectively. For example, the driver may get the indication from the LED 136a that the level of the wiper fluid has dropped below the pre-defined threshold level of the wiper fluid in the first reservoir 102. On getting such indication, the driver may refill the first reservoir 102 with the wiper fluid.

In one embodiment, the control module 136 including the LED 136a may be present inside the reservoir system 100. In another embodiment, the control module 136 including the LED 136a may present outside the reservoir system 100 in the vehicle. For example, the control module 136 may be disposed on a dashboard of the vehicle for easy accessibility. However, in the second embodiment, the control module 136 containing the LED 136a may be used in the operation of the reservoir system 100.

In one embodiment of the present invention, caps of the reservoirs, such as the first cap 140 and the second cap 144 may be color-coded for enabling the driver of the vehicle to identify the reservoir to be refilled. Further, a fill line 146 may be provided on each reservoir for providing indication of an upper limit for completely refilling the reservoir. In one embodiment, the fill line 146 may be different for the first reservoir 102 and the second reservoir 104.

The plurality of flanges 130 may be provided for installation purposes. The first reservoir 102 and the second reservoir 104 may be combined into one single unit with two separate compartments (for receiving the fluid). The first reservoir 102 and the second reservoir 104 may be fitted into a vehicle by using one or more flanges, such as 130a, 130b, 130c, 130d, and/or 130e, of the plurality of flanges 130. The reservoir system 100 may be installed as one single unit. Further the reservoir system 100 may be installed in an engine compartment including a car battery, such as the car battery 134, of the vehicle.

Further, FIG. 1 illustrates the wire harness 132a that may be utilized to electrically couple the first motor 106 and the second motor 108 to the control module 136. The control module 136 may be further electrically coupled to the car battery 134 through the wire harness 132b and a connector 148. In one embodiment of the present invention, an in-line fuse 150 may be utilized between the car battery 134 and the control module 136 to prevent any unforeseen situations, such as a short-circuit condition or an over-current condition, that may damage the car battery 134.

As the car battery 134 may be coupled to the control module 136, the car battery 134 may be enabled by the control switch 136 provided on the control module 136. The car battery 134 may be enabled to supply electrical power to the first motor 106 and to the second motor 108 by operating the control switch 136b of the control module 136. Accordingly, the fluid contained in the first reservoir 102 and the second reservoir 104 may be driven (by the first motor 106 and the second motor 108, respectively) at substantial force towards the spray heads 126 for spraying the fluid (wiper fluid and the de-icing fluid) onto the windshield. Further, the first motor 106 and the second motor 108 may be driven independently by using the control switch 136b for driving the wiper fluid or the de-icing fluid to the spray heads 126.

The fluid (such as the de-icing fluid and/or the wiper fluid), when sprayed onto the windshield of the vehicle, cleans the windshield of the vehicle and thus prevents build-up of environmental elements, such as ice or snow, on the windshield. Further, the fluid cleans the windshield, by removing the environmental elements from the windshield, without rendering the windshield flimsy or opaque and thereby aiding in improving the visibility of the driver of the vehicle.

In one embodiment of the present invention, each of the first reservoir 102 and the second reservoir 104 may have a semi-oval shape. Further, each of the first reservoir 102 and the second reservoir 104 may be about 6 inches wide and may have a height of about 14 inches with 4 inches to 6 inches round neck extension. In another embodiment of the present invention, the first reservoir 102 and the second reservoir 104 may be combined into a single unit using the plurality of flanges 130 to configure a 12 inch wide reservoir with two compartments. A first compartment of the two compartments may be configured by the first reservoir 102 and a second compartment configured by the second reservoir 104. Further, the first compartment and the second compartment may be configured to receive one liter of wiper fluid and one liter of de-icing fluid respectively. Further, bolts may be employed for assembling and installing the reservoir system 100. In one embodiment of the present invention, a typical size of the bolts used for assembling and installing the reservoir system 100 may be 10 millimeters.

Figure 2:
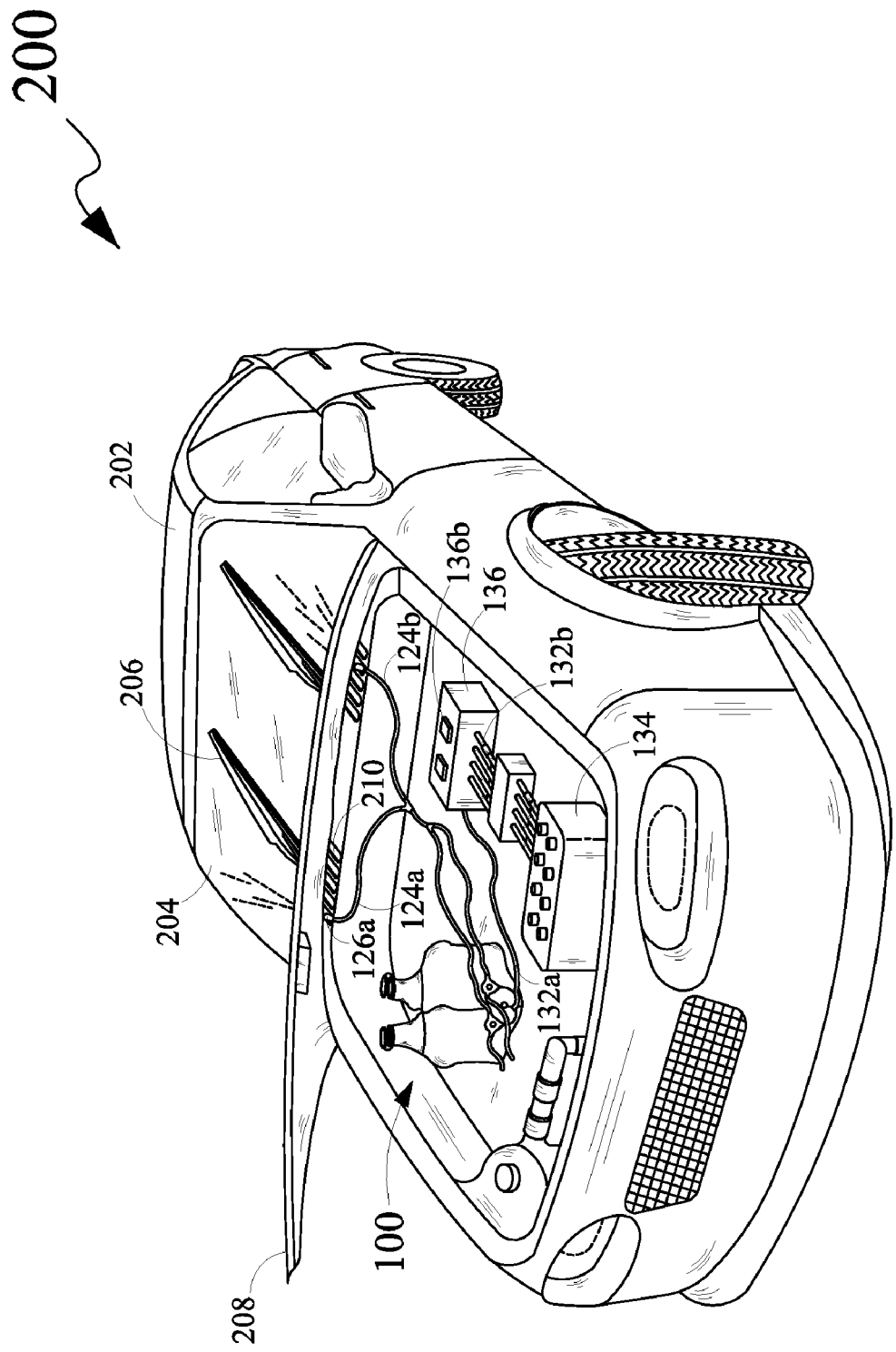
FIG. 2 illustrates a perspective view of a vehicle configured with the windshield wiper reservoir system of FIG. 1, in accordance with an embodiment of the present invention.

Referring now to FIG. 2, a perspective view 200 of a vehicle 202 equipped with the reservoir system 100 (as explained in FIG. 1) is shown, according to one embodiment of the present invention. The vehicle 202, shown in FIG. 2, is a car. However, the vehicle 202 is not limited to a car only, but may also include a bus, an auto rickshaw, a truck, and the like that has a windshield. The vehicle 202 represented in FIG. 2 is for exemplary purposes only and the order in which functioning of components of the vehicle 202 will be described should not be construed as a limitation, and any number of the described components may be combined in any order to make the reservoir system 100 operable in the vehicle 202.

The vehicle 202 of FIG. 2 includes a windshield 204, a wiper system 206, a front hood 208, and vents 210. The front hood 208 is shown as opened in FIG. 2 and the reservoir system 100 is shown as fitted under the front hood 208 of the vehicle 202. The reservoir system 100 is coupled to a car battery, such as the car battery 134, of the vehicle 202. Further, in one embodiment, the reservoir system 100 is fitted inside the front hood 208 of the vehicle 202 in such a way that spray heads, such as the spray heads 126, (attached to wiper tubes, such as the wiper tubes 124a and 124b) of the reservoir system 100 come out of the vents 210 that may be provided beneath the windshield 204. In another embodiment, the spray heads may be fitted inside the vents 210 and may not be visible outside. However, the spray heads may spray a fluid (such as the wiper fluid and the de-icing fluid from the first reservoir 102 and the second reservoir 104, respectively of the reservoir system 100 (as explained in FIG. 1)) onto the windshield 204 from the vents 210. Further, in one embodiment, spray heads may be provided beneath the wiper system 206 of the vehicle 202. In another embodiment, the spray heads may be provided beneath rubber blades (not shown) of the wiper system 206.

The wiper system 206 of the vehicle 202 may include one or more wipers to clean the windshield 204 of the vehicle 202. Each wiper of the wiper system 206 may include a rubber blade that may help in cleaning the windshield 204 properly. The spray heads of the reservoir system 100 may spray fluid from the vents 210 that may be provided below the rubber blade of the each wiper of the wiper system. It will be apparent to a person skilled in the art that the spray heads may be fitted at any suitable position inside or outside the front hood 208 of the vehicle 202 to spray the fluid onto the windshield 204 and is not limited to any position of the spray heads, specified herein.

The reservoir system 100 that may be fitted inside the front hood 208 of the vehicle 202 may be operated by gaining a power supply from the car battery 134 of the vehicle 202. Further, the car battery 134 may provide the power supply to the reservoir system 100 based on a control module, such as the control module 136, of the vehicle 202. The control module 136 may include a plurality of control switches, such as the control switches 136b, of the reservoir system 100 to switch on the power supply. The control module 136 may receive a power supply from the car battery 134 through a wire harness, such as the wire harness 132b. Further, the control module 136 may be coupled to the reservoir system 100 through a wire harness, such as the wire harness 132a, to provide the power supply received from the car battery 134 to the reservoir system 100. The wire harness 132a couples the reservoir system 100 to the control module 136.

A user of the reservoir system 100, such as a driver of the vehicle 202, may switch on the power supply of the vehicle 202 using the plurality of switches of the control module 136. The user may provide the power supply to enable a motor system, such as the first motor 106 and/or the second motor 108, of the reservoir system 100. The first motor 106 may be capable of relaying a wiper fluid to the wiper tubes and hence to the spray heads from the first reservoir, such as the first reservoir 102, of the windshield wiper reservoir system 100. Similar to the first motor 106, the second motor 108 of the motor system may be capable of relaying a de-icing fluid to the wiper tubes and hence to the spray heads from the second reservoir 104, of the reservoir system 100. The spray heads may spray the fluid (the wiper fluid and/or the de-icing fluid) onto the windshield 204 from the vents 210.

Further, other components like sensors, connecting tube, Light Emitting Diodes (LEDs), etc., of the reservoir system 100 and functioning of the other components in a vehicle are already explained in conjunction with FIG. 1, and for the sake of brevity, are not described again.

The present invention helps to improve visibility of drivers of vehicles by preventing build-up of environmental elements, such as a frost or ice onto the windshield of the vehicles. The fluid such as the wiper fluid and the de-icing fluid may further be driven independently of each other using the first motor 106 or the second motor 108, thereby providing better control over usage of respective fluids. Also, cleaning the windshield using the wiper fluid and the de-icing fluid is time-efficient and precludes rendering a surface of the windshield flimsy or opaque, thereby improving the visibility of vehicle drivers. Further, the windshield wiper reservoir system 100 is configured with dimensions to facilitate easy integration into typical windshield wiper systems in vehicles in a low-cost manner.

The above-described presently preferred embodiment can be modified into many alternative preferred embodiments. For instance, the windshield wiper reservoir system 100 may be one single unit with two compartments or formed of two separate tanks. It is to be noted that the windshield wiper reservoir system 100 is not limited to the exemplary configuration as described with respect to FIG. 1, but the windshield wiper reservoir system 100 may include a multitude of arrangements.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present invention.

What is claimed is:

1. A windshield wiper system for cleaning a windshield of a vehicle, the windshield wiper system comprising:
    a first reservoir comprising a first closeable opening, the first reservoir configured to store a wiper fluid;
    a second reservoir coupled to the first reservoir, the second reservoir comprising a second closeable opening, wherein the second reservoir is configured to store a de-icing fluid;
    a motor system coupled to the first reservoir and the second reservoir, the motor system configured to drive at least one of the wiper fluid from the first reservoir and the de-icing fluid from the second reservoir;
    a first rear tube extending from the first reservoir to the motor system, where the first rear tube provides flow of the wiper fluid;
    a second rear tube extending from the second reservoir to the motor system where the second tube provides flow of the de-icing fluid;
    a first front tube extending from the motor system providing flow of the wiper fluid;
    a second front tube extending from the motor system providing flow of the de-icing fluid;
    a first connector, where the first connector receives the first front tube and the second front tube extending from the motor system, where the first connector receives the flow of either the wiper fluid, de-icing fluid or a combination of wiper fluid and de-icing fluid;
    a connecting tube extending from the first connector to a second connector;
    at least one wiper tube extending from the second connector, where each said wiper tube includes a spray head and each wiper tube receives the flow of either wiper fluid, de-icing fluid or a combination of wiping in fluid and de-icing fluid that flows from the first connector through the connecting tube to the second connector;
    a control module, where the control module is coupled to the motor system via a first connection means and said control module controls the operations for the first reservoir and the second reservoir; and
    a power source, said power source coupled to the control module via a second connection means and said power source provides power to the motor system.

2. The windshield wiper reservoir system of claim 1 further comprising a first cap, the first cap removably coupled to the first closeable opening of the first reservoir.

3. The windshield wiper reservoir system of claim 1 further comprising a second cap, the second cap removably coupled to the second closeable opening of the second reservoir.

4. The windshield wiper reservoir system of claim 1, wherein each of the first reservoir and the second reservoir comprises a fill line, the fill line configured to provide an indication of an upper limit for filling the each of the first reservoir and the second reservoir.

5. The windshield wiper reservoir system of claim 1, wherein the motor system comprises a first motor and a second motor, the first motor capable of driving the wiper fluid to the plurality of wiper tubes and the second motor capable of driving the de-icing fluid to the plurality of wiper tubes.

6. The windshield wiper reservoir system of claim 1 further comprising a plurality of sensors coupled to the first reservoir and the second reservoir, the plurality of sensors configured to sense a drop in a level of at least one of the wiper fluid and the de-icing fluid.

7. The windshield wiper reservoir system of claim 6 further comprising a plurality of light emitting diodes (LEDs), the plurality of LEDs capable of being activated based on the sensed drop in the level of at least one of the wiper fluid and the de-icing fluid by the plurality of sensors.

8. A windshield wiper system for cleaning a windshield of a vehicle, the windshield wiper system comprising:
    a first reservoir comprising a first closeable opening, the first reservoir configured to store a wiper fluid, where said wiper fluid is maintained at a first pre-defined level;
    a second reservoir coupled to the first reservoir, the second reservoir comprising a second closeable opening, wherein the second reservoir is configured to store a de-icing fluid, where de-icing fluid is a different fluid than the wiper fluid and said de-icing fluid is maintained at a second pre-defined level;
    a motor system, said motor system including a first motor coupled to the first reservoir and a second motor coupled to the second reservoir, the motor system configured to drive at least one of the wiper fluid from the first reservoir and the de-icing fluid from the second reservoir;
    a first rear tube extending from the first reservoir to the motor system, where the first rear tube provides flow of the wiper fluid;
    a second rear tube extending from the second reservoir to the motor system where the second tube provides flow of the de-icing fluid;
    a first front tube extending from the motor system providing flow of the wiper fluid;
    a second front tube extending from the motor system providing flow of the de-icing fluid;
    a first connector, where the first connector receives the first front tube and the second front tube extending from the motor system, where the first connector receives the flow of either the wiper fluid, de-icing fluid or a combination of wiper fluid and de-icing fluid;
    a connecting tube extending from the first connector to a second connector;

at least one wiper tube extending from the second connector, where each said wiper tube includes a spray head and each wiper tube receives the flow of either wiper fluid, de-icing fluid or a combination of wiping in fluid and de-icing fluid that flows from the first connector through the connecting tube to the second connector;

a control module, where the control module is coupled to the motor system via a first connection means and said control module controls the operations for the first reservoir and the second reservoir; and a power source, said power source coupled to the control module via a second connection means and said power source provides power to the motor system.

9. The windshield wiper system according claim 8, where the first reservoir includes a first cap of a first color and the second reservoir includes a second cap of a second color signifying different fluids in the first reservoir and second reservoir.

10. The windshield wiper system according claim 8, where the motor system draws fluid from the reservoirs based on the pre-defined threshold level of the fluid in the reservoirs.

11. The wiper system according to claim 1 where the power source is a battery.

12. The wiper source according to claim 1 where said control module includes a plurality of light emitting diodes and a plurality of switches.

13. The wiper system according to claim 1 where said motor system draws fluid from the first reservoir and the second reservoir based upon pre-defined threshold levels of the fluid in each respective reservoir.

\* \* \* \* \*